(12) United States Patent
Takano et al.

(10) Patent No.: US 10,773,472 B2
(45) Date of Patent: Sep. 15, 2020

(54) METHOD FOR MANUFACTURING FIBER-REINFORCED PLASTIC MOLDED BODY

(71) Applicant: Mitsubishi Chemical Corporation, Chiyoda-ku (JP)

(72) Inventors: Tsuneo Takano, Chiyoda-ku (JP); Takashi Honma, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 248 days.

(21) Appl. No.: 15/571,067

(22) PCT Filed: May 30, 2016

(86) PCT No.: PCT/JP2016/065921
§ 371 (c)(1),
(2) Date: Nov. 1, 2017

(87) PCT Pub. No.: WO2016/194873
PCT Pub. Date: Dec. 8, 2016

(65) Prior Publication Data
US 2018/0162074 A1    Jun. 14, 2018

(30) Foreign Application Priority Data
Jun. 2, 2015 (JP) ................................. 2015-112319

(51) Int. Cl.
*B29C 33/54* (2006.01)
*B29C 43/10* (2006.01)
(Continued)

(52) U.S. Cl.
CPC ............ *B29C 70/446* (2013.01); *B29C 33/54* (2013.01); *B29C 43/10* (2013.01); *B29C 43/361* (2013.01);
(Continued)

(58) Field of Classification Search
CPC ....... B29C 43/10; B29C 43/18; B29C 70/021; B29C 33/54; B29C 43/3642;
(Continued)

(56) References Cited

U.S. PATENT DOCUMENTS 7,638,084 B2 * 12/2009 Frankel ................... B29C 70/32
264/101
2007/0096368 A1 * 5/2007 Hanson .............. B29D 99/0003
264/314

(Continued)

FOREIGN PATENT DOCUMENTS

DE  10 2006 031 334 A  1/2008
EP     2 067 596 A1   6/2009
(Continued)

OTHER PUBLICATIONS

Extended European Search Report dated May 25, 2018 in European Patent Application No. 16803308.2, 7 pages.
(Continued)

*Primary Examiner* — Alison L Hindenlang
*Assistant Examiner* — Debjani Roy
(74) *Attorney, Agent, or Firm* — Oblon, McClelland, Maier & Neustadt, L.L.P.

(57) ABSTRACT

Provided is a method for manufacturing a fiber-reinforced plastic molded body by which, when a molded article having a hollow part is being molded using a molding mold, it is possible to deform the peripheral surface area of a core by increasing the pressure inside the core without using pressurized gas or pressurized fluid. A group of particles and the like including a particle group and a core block is accommodated in a flexible bag to form a core. The particle group is composed of multiple rigid particles. The core is arranged inside a prepreg containing a resin and fibers, and the
(Continued)

prepreg including the core is arranged inside a molding mold and is molded by applying pressure.

11 Claims, 6 Drawing Sheets

(51) Int. Cl.
  *B29C 70/44* (2006.01)
  *B29C 43/36* (2006.01)
  *B29C 70/46* (2006.01)
  *B29K 105/08* (2006.01)
  *B29L 31/30* (2006.01)
  *B29L 22/00* (2006.01)
  *B29C 70/34* (2006.01)
  *B29K 63/00* (2006.01)
  *B29K 307/04* (2006.01)

(52) U.S. Cl.
  CPC .......... *B29C 43/3642* (2013.01); *B29C 70/46* (2013.01); *B29C 70/342* (2013.01); *B29C 2043/106* (2013.01); *B29C 2043/3613* (2013.01); *B29C 2043/3652* (2013.01); *B29C 2043/3668* (2013.01); *B29K 2063/00* (2013.01); *B29K 2105/08* (2013.01); *B29K 2105/0872* (2013.01); *B29K 2307/04* (2013.01); *B29L 2022/00* (2013.01); *B29L 2031/3076* (2013.01)

(58) Field of Classification Search
  CPC .......... B29C 2043/3613; B29C 70/023; B29C 2043/3649; B29K 2105/0872; B60B 5/02
  See application file for complete search history.

(56) References Cited

U.S. PATENT DOCUMENTS

| | | | |
|---|---|---|---|
| 2009/0152775 A1 | 6/2009 | Grankall et al. | |
| 2009/0166935 A1* | 7/2009 | Jacob | B29C 33/3821 264/571 |
| 2011/0076461 A1 | 3/2011 | Jacob et al. | |
| 2015/0183139 A1* | 7/2015 | Takano | B29C 70/44 264/219 |

FOREIGN PATENT DOCUMENTS

| | | |
|---|---|---|
| EP | 2 860 006 A1 | 4/2015 |
| JP | 2-238912 A | 9/1990 |
| JP | 2008-73876 A | 4/2008 |
| JP | 2008-155383 A | 7/2008 |
| JP | 2012-187730 A | 10/2012 |
| WO | 2013/187399 A1 | 12/2013 |

OTHER PUBLICATIONS

International Search Report dated Aug. 16, 2016 in PCT/JP2016/065921 filed May 30, 2016.
European Office Action dated May 24, 2019 in European Patent Application No. 16803308.2, 5 pages.

* cited by examiner

[Fig. 1]
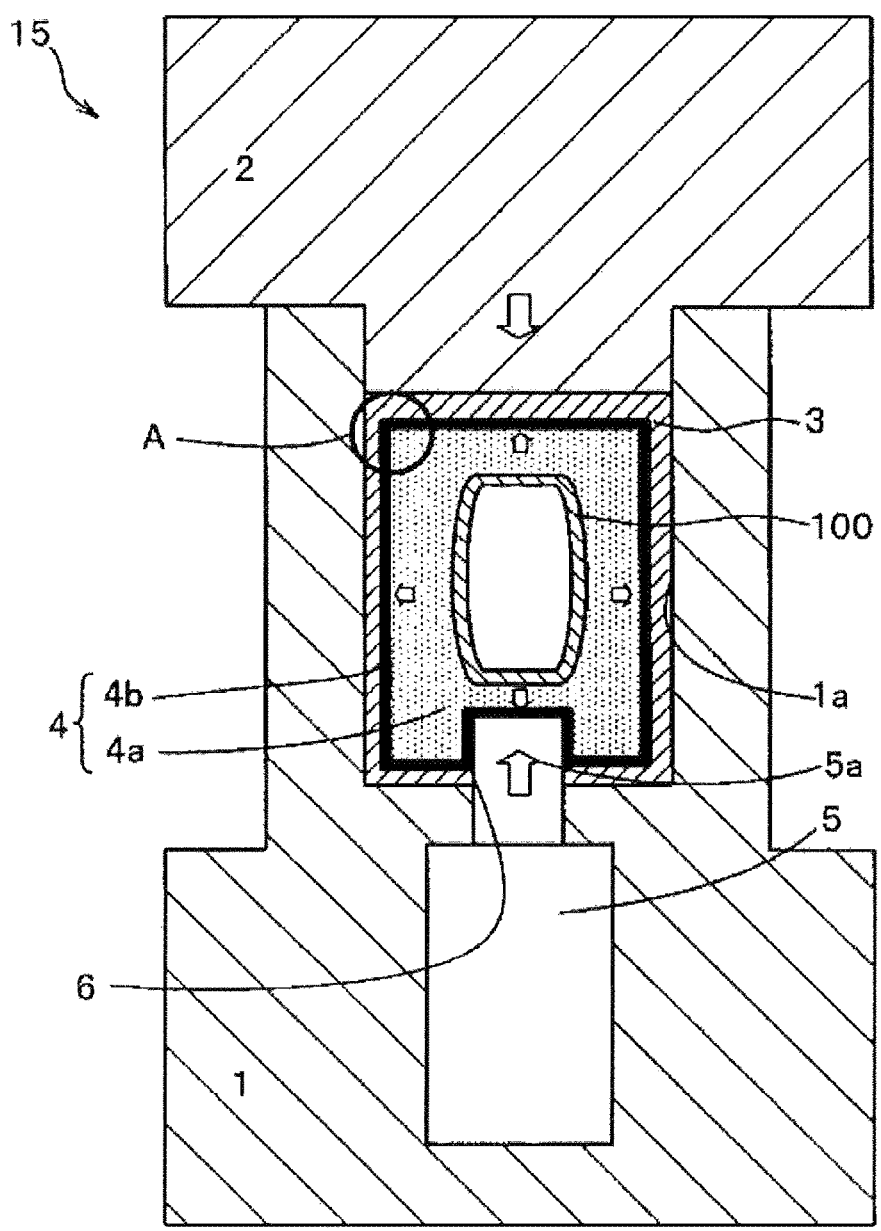

[Fig. 2]
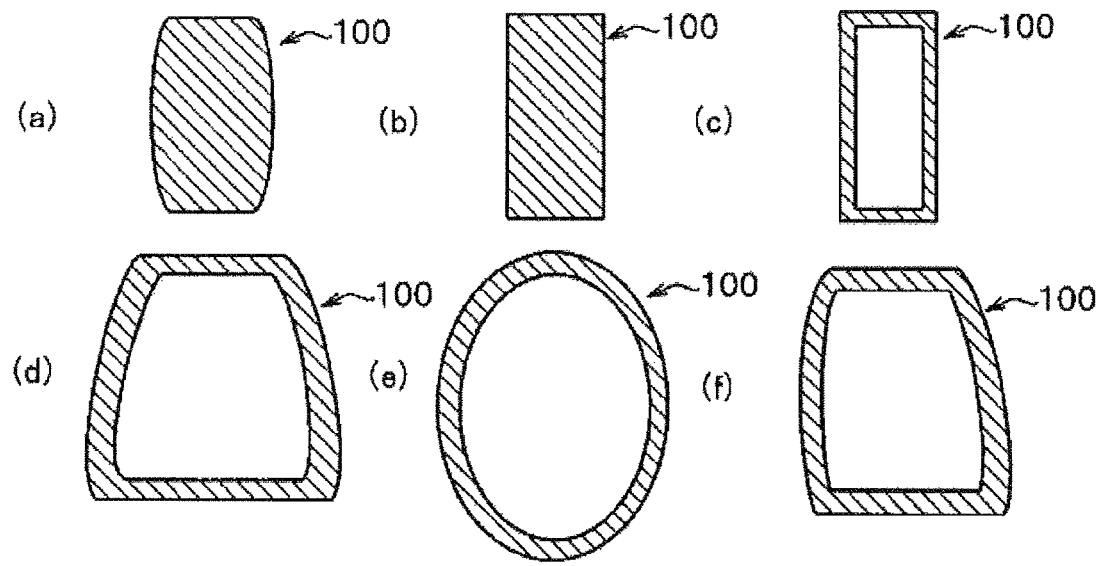
[Fig. 3]
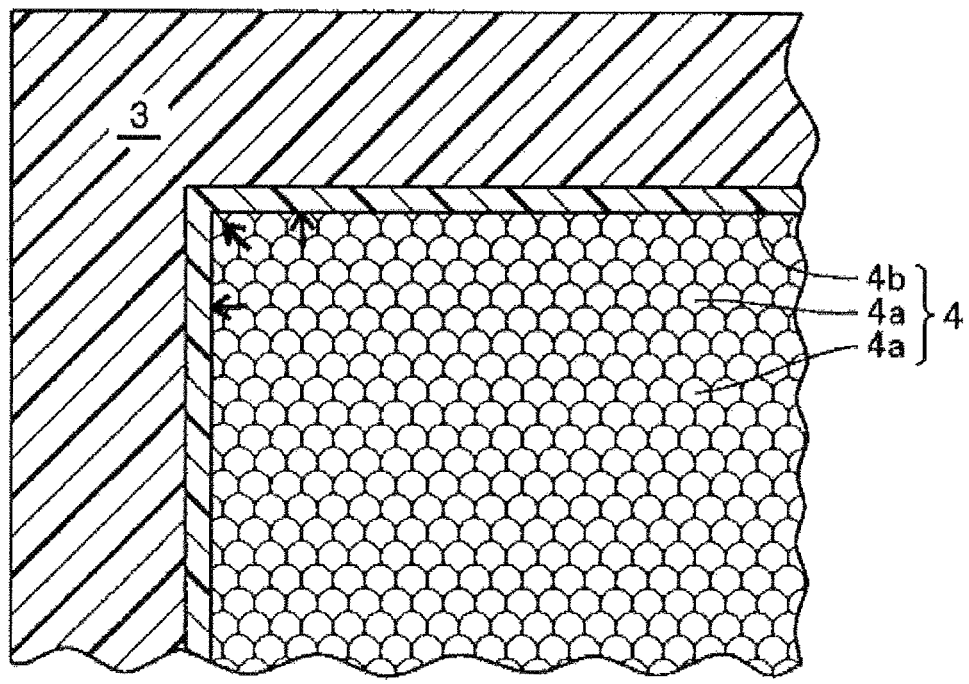

[Fig. 4]
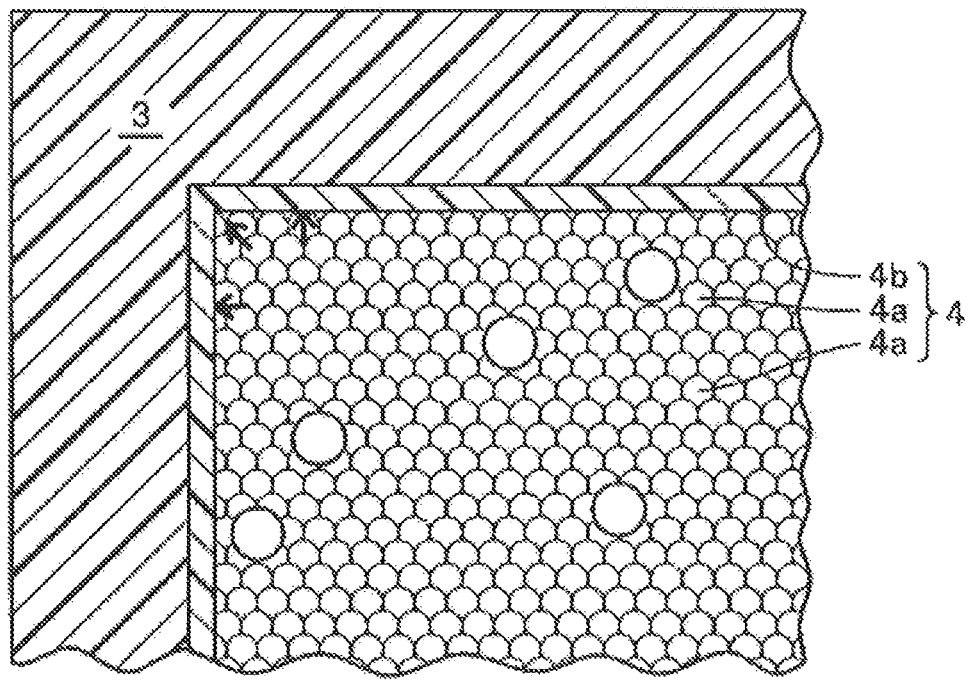
[Fig. 5]
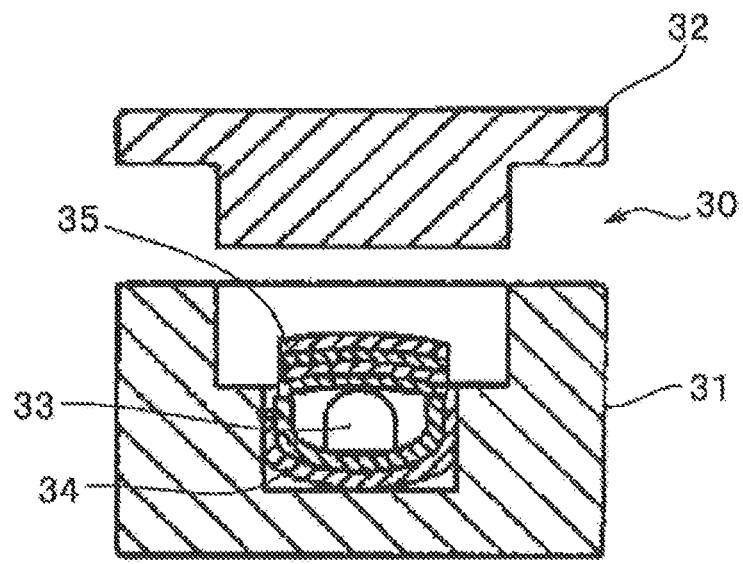

[Fig. 6]
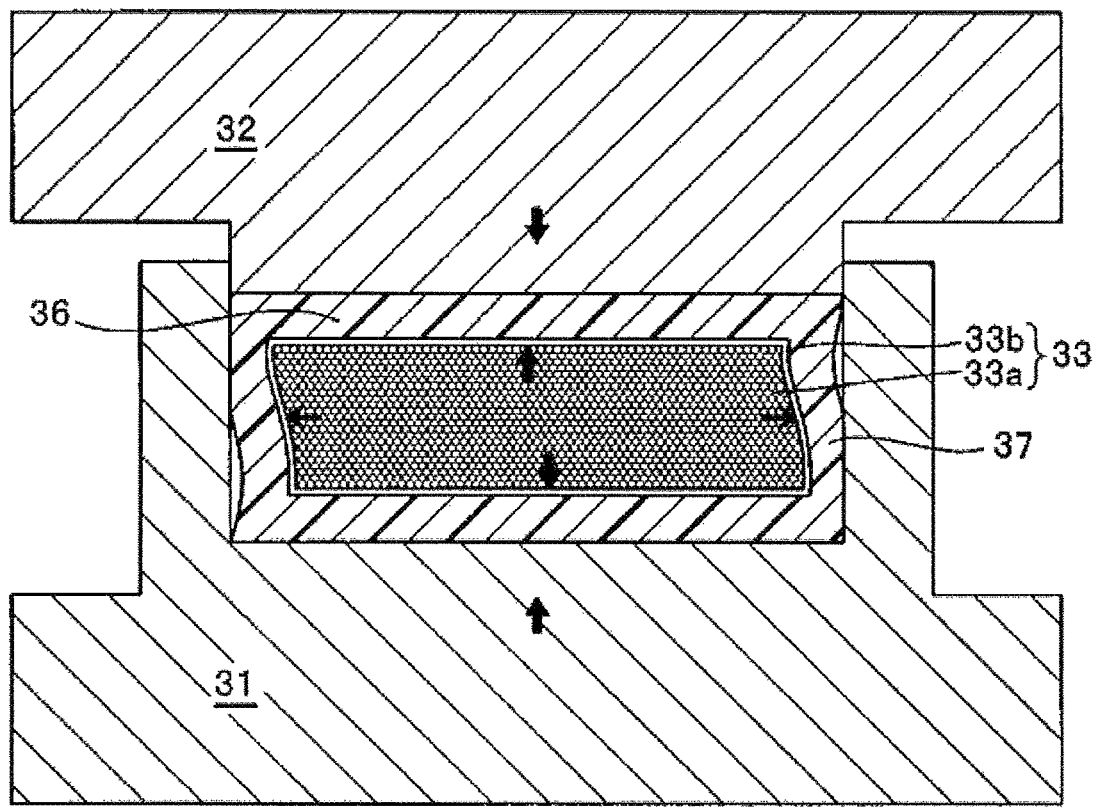

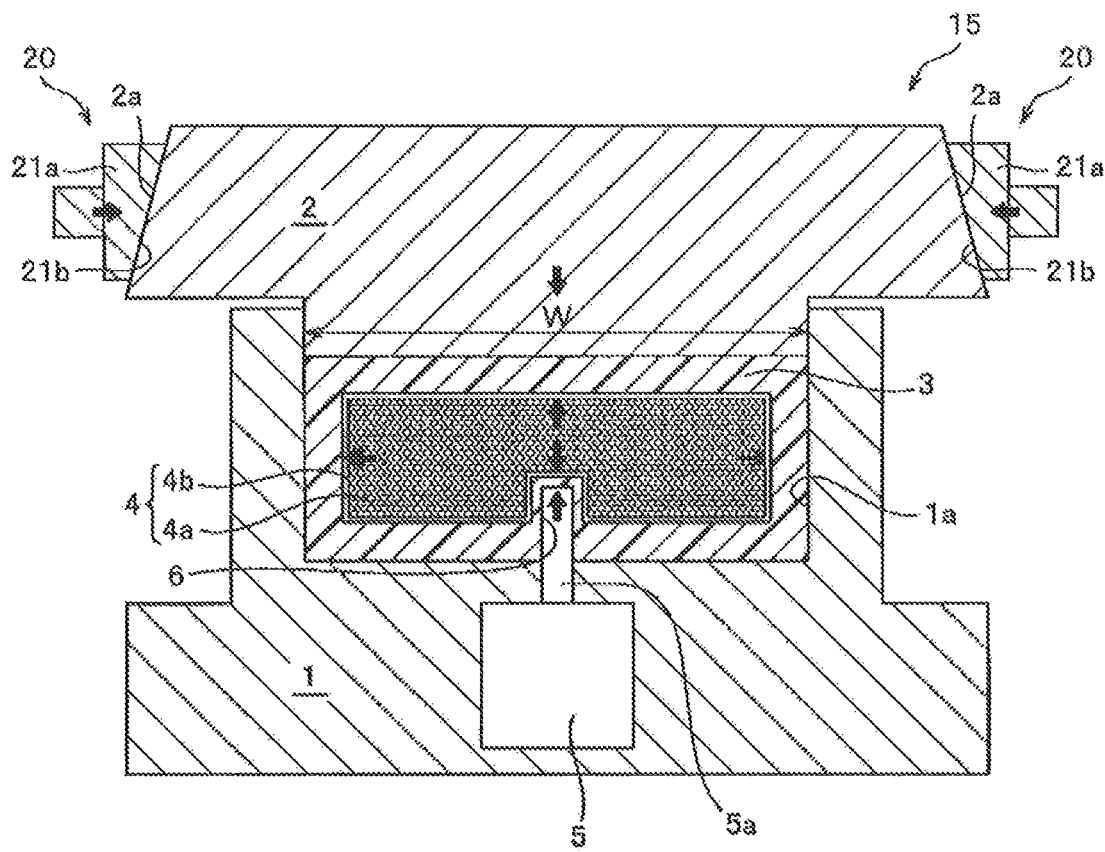
[Fig. 7]

[Fig. 8]
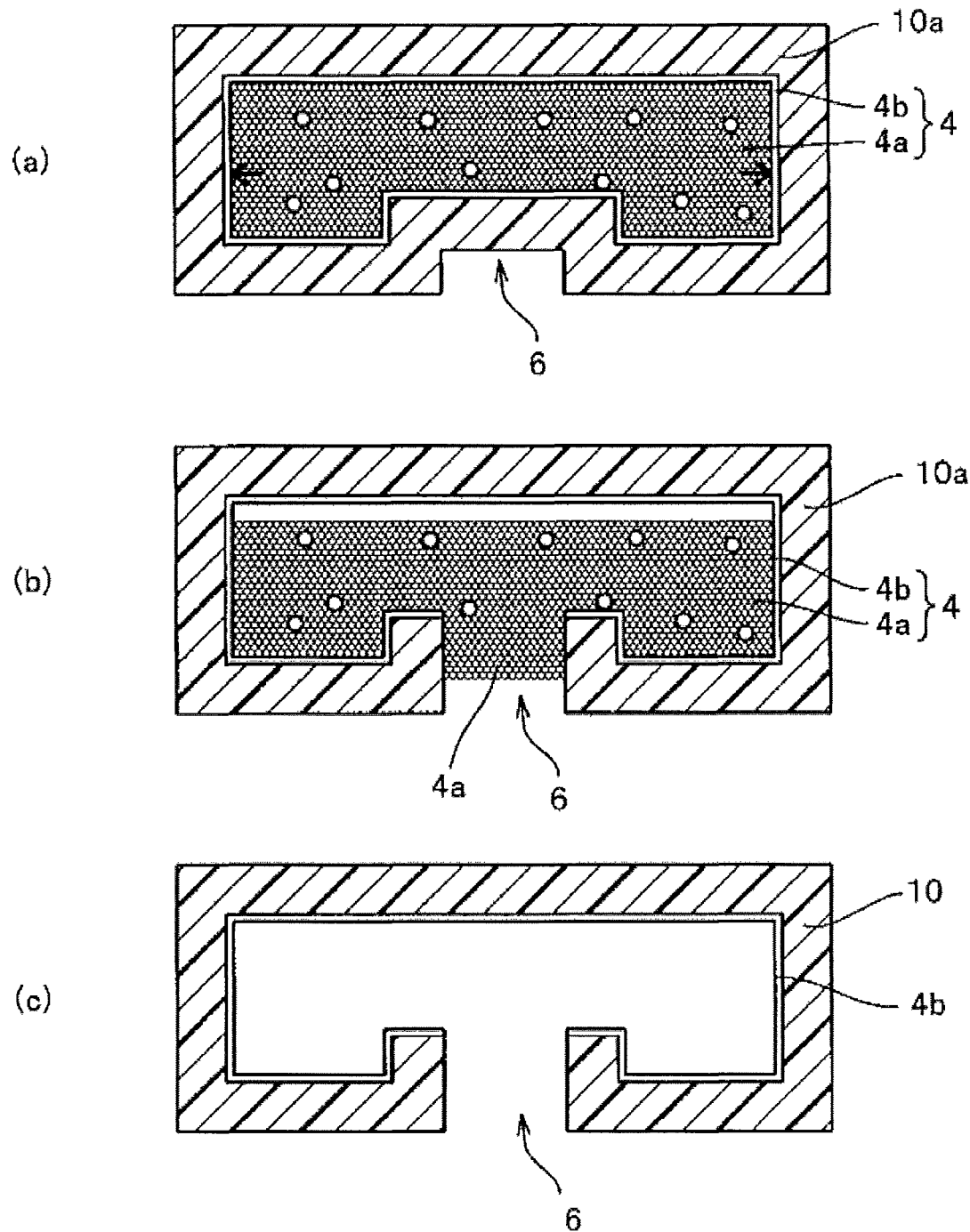

METHOD FOR MANUFACTURING FIBER-REINFORCED PLASTIC MOLDED BODY

TECHNICAL FIELD

The present invention relates to a method for manufacturing a hollow molded body made of a fiber-reinforced plastic (FRP) having a closed cross-section by performing heat pressing on a prepreg, which is obtained by impregnating fiber with a resin, using a core.

BACKGROUND ART

Fiber-reinforced plastic molded bodies having a closed cross-section are widely used in large molded bodies such as bodies and wings of aircrafts to small molded bodies such as bicycle frames, tennis rackets, fishing rods, and golf shafts. In addition, fiber-reinforced plastic molded bodies having an open cross-section are also widely used for helmets and the like.

As a core for forming a molded body having a closed cross-section, a core in which a powder-and-granular material is wrapped with a packaging film and formed into a predetermined shape by performing vacuum packaging, a core in which a large number of particle groups are accommodated in a flexible bag so as to able to be deformed into a desired shape, a core formed by blow molding, or the like is used. A core in which a vacuum-packaged powder-and-granular material is formed into a desired shape is disclosed, for example, in JP 2-238912 A (Patent Literature 1), or a core in which a large number of particle groups are accommodated in a flexible bag so as to able to be deformed into a desired shape is disclosed, for example, in JP 2012-187730 A (Patent Literature 2).

The invention described in Patent Literature 1 will be described as Conventional Example 1 of the present invention by means of FIG. 5 and FIG. 6. FIG. 5 illustrates an initial stage at which a molded article having a hollow part which is a type of closed cross-section is manufactured by a molding die 30. As illustrated in FIG. 5, a sheet-like lower fiber-reinforced thermoplastic resin material (lower FRTP) 34 which is subjected to pre-heating to be in a molten state is placed on a lower mold 31 of the molding die 30. Since the lower FRTP 34 is in the molten state, the lower FRTP 34 is hung under its own weight and enters a state of being depressed in the concave portion of the lower mold 31.

A core 33 in which a powder-and-granular material 33a is wrapped with a packaging material 33b and solidified in a predetermined shape by vacuum packaging is placed in the concave portion of the lower FRTP 34. On upper portion of the lower FRTP 34 in which the core 33 is placed, another sheet-like upper FRTP 35 which is heated to be in a molten state is placed. In this state, the circumference of the core 33 is in a state of being enclosed by the lower FRTP 34 and the upper FRTP 35.

An upper mold 32 of the molding die 30 is lowered from this state and pressurized such that the lower FITP 34 and the upper FRTP 35 are integrally molded in a state of accommodating the core 33 therein by integrating the lower FRTP 34 and the upper FRTP 35 between the upper mold 32 and the lower mold 31, thereby obtaining a molded semi-finished article. In order to discharge the core 33 from the completed molded semi-finished article, small holes are formed in the molded semi-finished article. When holes are formed in the molded semi-finished article, air infiltrates into a space between the powder-and-granular materials 33a of the vacuum-packaged core 33 and the binding of the powder-and-granular materials 33a is loosened.

Then, the powder-and-granular material 33a constituting the core 33 is discharged to the outside of the molded semi-finished article through the holes formed in the molded semi-finished article, thereby completing a molded article. If the packaging material 33b which vacuum-packages the powder-and-granular material 33a is made of a material having good releasability with respect to the molded article, the packaging material 33b can also be detached from the molded article through the holes.

Next, the invention described in Patent Literature 2 will be described as Conventional Example 2 of the present invention by means of FIG. 7. FIG. 7 illustrates a state at the time of molding a hollow molded article having a modified cross-section using a conventional core. According to this Conventional Example 2, a core 4 is used in which a particle group 4a formed from a large number of particles is wrapped with a stretchable packaging film 4b. When compression molding is carried out by lowering an upper mold 2 to press a prepreg 3 between the upper mold 2 and a lower mold 1, a mold interval holding means 20 is operated to prevent the upper mold 2 from moving to the upper side by a pair of right and left press members 21a and 21a. Simultaneously, a part of the core 4 is pressed by causing a piston rod 5a provided in the lower mold 1 to protrude into a cavity. By pressing the core 4 with the piston rod 5a, the internal pressure of the core 4 is increased to deform the core 4 while causing the particle group 4a of the core 4 to flow, thereby eliminating voids between the core 4 and the prepreg 3. There is no void inside a molded article to be obtained and a high-grade molded article is obtainable. Moreover, the mold interval holding means 20 is provided which prevents the upper mold 2 from moving in a direction apart from the lower mold 1 when the internal pressure of the core 4 is increased.

The mold interval holding means 20 has lower inclined surfaces 2a and 2a formed in upper end portions on right and left lateral surfaces (upper right and left end shoulders in FIG. 7) of the upper mold 2 and wedge faces 21b and 21 b being in slide contact with the lower inclined surfaces 2a and 2a in a surface contact state, and includes the pair of right and left press members 21a and 21a which freely slide in a direction (horizontal direction) orthogonal to a moving direction (up-and-down direction) of the upper mold 2 and a driving unit (not illustrated) which moves the press members 21a and 21a in the horizontal direction to drive them in approaching and separating directions. The shapes of the wedge faces 21b and 21b facing the pair of right and left press members 21a and 21a are set to shapes in which a space between the facing wedge faces 21b and 21 b is spread to the lower side as illustrated in FIG. 7.

Herein, as the packaging film 4b used for maintaining the shape of the core 4 used in Conventional Example 2, a nylon film, a polyethylene film, a fluororesin film, silicone, and the like can be used. Examples of preferred materials as particles having rigidity particularly include zirconia and quartz, and these materials have low thermal conductivity and granular materials having a high bending elastic modulus are obtainable therefrom.

CITATION LIST

Patient Literature

Patent Literature 1: JP 2-238912 A
Patent Literature 2: JP 2012-187730 A

SUMMARY OF THE INVENTION

Problem to be Solved by the Invention

According to the molding method of a molded article having a hollow part proposed in Patent Literature 1, in a state where the core 33 is interposed between the lower FRTP 34 and the upper FRTP 35 as described above, the lower FRTP 34 and the upper FRTP 35 are pressurized between the upper mold 32 and the lower mold 31 by lowering the upper mold 32. When the core 33 is placed in the concave portion of the lower FRTP 34, which has been formed by being depressed into the concave portion of the lower mold 31 at this time, or when the core 33 is covered with the upper FRTP 35 from above, voids are formed between the corner portions of the concave portion of the lower mold 31 and the lower FRTP 34 or between the core 33 and the lower and upper FRTPs 34 and 35, for example, as illustrated in FIG. 5.

When heat pressing is performed by the upper mold 32 and the lower mold 31 in the state where the voids remain, the lower FRTP 34 and the upper FRTP 35 cannot be sufficiently supported by the core 33 from the inside, and particularly, in a part of the lower FRTP 34 formed along the same direction as the up-and-down direction in which the upper mold 32 moves, that is, in a vertical part, a change in thickness occurs. Moreover, the shape of the outer periphery of the lower FRTP 34 may not be formed into a shape that follows the shape of the corner portion of the concave portion of the lower mold 31. Furthermore, wrinkles may appear in the outer surfaces, or the shape of the outer periphery may be formed into a buckled shape in the up-and-down direction. Alternatively, the vertical part may be molded in a compressed state in which the length thereof is shorter than the specified length, resulting in the degradation of dimensional accuracy of products.

Particularly, when the lower FRTP 34 and the upper FRTP 35 are made of a long fiber reinforced resin material using long fibers, in a case where pressure molding is performed while voids are present between the core 33 and the lower and upper FRTPs 34 and 35 or between the upper and lower molds 32 and 31 and the lower and upper FRTPs 34 and 35, the fiber orientation of the long fibers is disordered and bends thereof occur, resulting in the degradation of the strength as the fiber-reinforced plastic and deterioration of the appearance of molded products, for example, as illustrated in FIG. 6.

Description will be further given by means of FIG. 6 schematically illustrating the configuration of Conventional Example 1. In FIG. 6, the aforementioned vertical part is denoted by reference numeral 37. Further, FIG. 6 illustrates a state where an annular prepreg 36 having the core 33 disposed therein is accommodated in the concave portion formed in the lower mold 31 and where the upper mold 32 is lowered toward the lower mold 31.

As illustrated in FIG. 6, a molded semi-finished article can be manufactured by interposing the prepreg 36 between the upper mold 32 and the lower mold 31 to be subjected to heat pressing. Then, holes are formed in the completed molded semi-finished article and then the granular material constituting the core 33 is discharged to the outside through the holes formed in the molded semi-finished article, thereby completing a hollow molded article.

However, when the core 33 is placed in the concave portion formed in the prepreg 36 accommodated in the lower mold 31, in many cases, voids are formed between the outer surface of the core 33 and the inner periphery of the prepreg 36, for example, in a case where the molded semi-finished article is shaped into a shape having angular portions. Particularly, when some space is provided between the molding die 30 and the prepreg 36 in order to smoothly insert the prepreg 36 into the molding die 30, voids are likely to occur between the corner portions of a molding surface and the prepreg 36, similarly.

Further, when the prepreg 36 is pressurized by lowering the upper mold 32 toward the lower mold 31, wrinkles and bends may occur in the vertical part 37 of the prepreg 36 due to the influence of the voids or the angular portions of the outer surface side of the prepreg 36 may not be formed into a desired right-angled shape, and thus the prepreg 36 may remain to be not charged state.

Particularly, when the used amount of the powder-and-granular material constituting the core 33 is small, voids may be formed between the prepreg 36 and the core 33 and bends may occur in the vertical part 37 of the prepreg 36. Then, as illustrated in FIG. 6, a part of the vertical part 37 is deformed into a shape that is curved toward the core 33. Moreover, in a case where the fluidity of the powder-and-granular material constituting the core 33 is low, the influence of the deformation becomes significant.

Further, even if a part of the vertical part 37 is not deformed into a shape that is curved toward the core 33, the vertical part 37 may be compressed so that the length thereof is shorter than a specified length as illustrated in FIG. 6.

In the invention described in Patent Literature 1, in order not to produce defective products, enhancement of the precision in preforming the prepreg 36 or forming of the core 33 into a desired shape is necessary so that no void is formed between the prepreg 36 and the core 33. However, configuring the core 33 by precisely measuring the used amount of the powder-and-granular material constituting the core 33, forming the shape thereof into the desired shape and then bringing the prepreg 36 into close contact with the core 33, and further allowing the shape of the external shape of the prepreg 36 to follow the inner surface shape of the molding die 30 need much time and effort due to the instability of the shapes of the powder-and-granular material that is not completely fixed and the prepreg that is not cured or solidified.

Meanwhile, in recent years, particularly, there has been a strong demand for increasing a molded article in size and decreasing the molded article in weight with respect to a molded article molded by Conventional Example 2 described above. The increasing of the size of the molded article leads to increasing of the size of the molding die, and in order to decrease the molded article in weight, a hollow part needs to be expanded as described above. In order to expand the hollow part, it is inevitable to increase the core in size, and the amount of particles filled in a stretchable packaging film also needs to be largely increased. Granular materials such as ceramics such as alumina and zirconia, glass, hard heat-resistant resins, metals, foundry sand, and quartz are used for granular materials constituting the core 4; however, when the amount of these particles is increased, weight is naturally increased as well as volume, and thus the core cannot be handled by manpower unlike conventional cases so as to necessarily rely on mechanization. For these reasons, costs for design, production, maintenance, and the like required for such mechanization are increased.

The present invention has been developed in view of such circumstances and an object thereof is to provide a method for manufacturing a fiber-reinforced plastic molded body by which a pressure between a prepreg and a core can be uniformly increased at the time of molding a molded article having a closed cross-section by a molding die and a part of a medium constituting the core can be prevented from being leaked from the molding die even when a pressure is applied to the core and a typical molding die is used, and which can be efficiently and economically carried out even when a molded article having a closed cross-section is increased in size.

Means for Solving Problem

The main configuration of a method for manufacturing a fiber-reinforced plastic molded body of the present invention includes:

accommodating a particle group including rigid particles and a core block in a flexible bag that can be expanded to form a core;

disposing the core inside a prepreg containing a resin and fibers; and disposing the prepreg having the core inside a molding die, followed by compression molding.

Herein, in the above-described configuration, it is the most important feature that the core block is included in the core. Moreover, the core block preferably has bendability, and owing to the presence of the core block, it is possible to increase the size of the molded article, improve the degree of freedom in shape, and decrease the weight of the molded article.

Incidentally, the core block described in the present invention means a member that has a larger outer contour volume than those of the rigid particles and low density and flows inside the flexible bag along with the rigid particles.

Effect of the Invention

In the present invention, the particle group including rigid particles and a core block is accommodated in the flexible bag that can be expanded to form a core. Furthermore, when a part of the outer surface of the core is pressed through or not through the prepreg at the time of the compression molding by the molding die, a depressed portion is formed in the outer surface of the core so as to forcefully increase the internal pressure by the core. Further, by increasing the internal pressure by the core, slippage is caused between the particles constituting the core, and the outer surface of the core is deformed in an expanded state while being unfolded.

When the rigid particles and the core block are concurrently used in the particle group constituting the core, and a part of the outer surface of the core is pressed to form a depressed portion in the outer surface so that the internal pressure of the core is increased, slippage occurs between the particles at the outside of the core block, the rigid particles move, and thus fluidity and pressure transmission of the particle group in the core are improved. By adjusting the size of the core block or the number of the core blocks according to the volume of the molded article, the used amount of the rigid particles can be largely reduced. At this time, in order to reduce the used amount of the rigid particles, the core block is preferably lighter than the particle group. Further, when the core block has a hollow structure, the weight at the time of molding can be largely reduced, a required increase in size can be realized, and handleability of the core is also improved.

Further, when the outer surface of the core is expanded by pressing the core with rods, if voids are formed between the prepreg wrapping the core and the core, these voids are filled by deformation of the core and thus can be resolved. In addition, particularly, even when voids are formed between the corner portion on the molding surface of the molding die and the prepreg, the prepreg can be moved in a direction for filling the voids by deformation of the core and the voids of the corner portion can be eliminated.

The voids formed between the prepreg and the core are crushed due to the high internal pressure in the core or air of the voids is released into the atmosphere from the molding die through the prepreg by deformation of the core. A passage formed when the air passes through the prepreg is spontaneously closed by the prepreg melted after the air passes through the prepreg.

The core includes a particle group formed by a large number of particles inside the core in addition to the aforementioned core block accommodated in the bag having ductility and excellent flexibility. For this reason, even when the core is deformed by pressing a part of the outer surface of the core to form the depressed portion in the outer surface, the internal pressure inside the core is not always show the same pressure condition at all the portions unlike it does when a fluid or gas is used. That is, even when a pressure is applied to the particle group, a pressure of a smaller magnitude than the pressure at the portion to which the pressure has been applied occurs in another portion. Then, when the applied pressure is more than a certain value, slippage occurs between particles.

Therefore, even when the internal pressure is significantly increased at a portion in which a depressed portion is formed on the outer surface of the core due to pressing at the time of pressing the outer surface of the core, an increase in pressure at a portion of the outer surface side of the core distant from that portion is lower than the internal pressure at the portion in which the depressed portion is formed. In addition, the pressure in a direction orthogonal to the pressing direction tends to be difficult to increase.

Particularly, the transmission of the pressure in the core and the fluidity of the particles are affected by the roughness of the particle surfaces constituting the particles, the particle diameter, the rigidity of the particles, and the like. When a particle group constituted only by a plurality of particles having uniform particle diameters or the same rigidity is used, the particles constituting the particle group are packed in the core at a high density and thus the fluidity of the particle group is inhibited, resulting in the degradation of the transmission of the pressure. Therefore, by considering the distribution state of the particle diameter and the distribution state of the particle surface roughness in the core, the fluidity of the particle group and the pressure transmission in the core are increased. However, since the pressure in the direction orthogonal to the pressing direction tends to be difficult to increase, it is preferable to provide the action to increase the pressure into the direction orthogonal to the pressing direction to the core block disposed in the core.

For doing so, the shape of the core block preferably includes an outer contour shape in which the cross-section of the core block along substantially the pressing direction and substantially the mold inner surface is gradually reduced toward the inner surface of at least one mold positioned at substantially the pressing direction, that is, a shape in which the periphery orthogonal to the pressing direction is curved outward and bulges (including a barrel shape, a cup shape, an inverted cup shape, a vertically elongated elliptical cross-section including a circular shape, or the like).

Herein, for example, even in the case of the core block having a rectangular cross-section, when one surface of the core block and the opposing surface thereof are vertically pressed, the aforementioned action can be obtained as long as the other surface substantially parallel to the pressing direction is curved outward. In addition, in the case of the core block having a hollow structure, in order not to easily deform the core block inward by the pressure of the particles, the shape of the core block is set to a curved shape which bulges in the direction substantially orthogonal to the pressing direction, and further, the hollow core block is widened and deformed in the direction substantially orthogonal to the pressing direction. Accordingly, a pressure can be applied in the direction orthogonal to the pressing direction. Furthermore, even in a case where the shape of the molded article is bent like an L-shaped hollow shape, a pressure can also be effectively applied in the direction substantially orthogonal to the pressing direction as long as the core block is divided or the core block has a bending shape corresponding to the shape of the molded article.

Even in the portion in the core apart from the portion in which the depressed portion is formed by pressing in this way, slippage between the particles constituting the particle group and thus deformation occurs. By this deformation, the prepreg can be pressed along the molding surface of the molding die, and for example, a pressure between the portion of the core supporting the vertical part as described above and the prepreg can be increased. As a result, it is possible to prevent the vertical part as described above from being bent to be deformed at the time of performing pressing by the upper mold and the lower mold.

In the molding method of the present invention, it is important to concurrently use the rigid particles and the core block.

As the rigid particles, ceramics such as alumina and zirconia, glass, hard heat-resistant resins, metals, foundry sand, and the like which have a high rigidity with a bending elastic modulus of 50 GPa or more can be used. Particularly, in the case of using zirconia or quartz formed from ceramics, these materials have low thermal conductivity and thus are favorable materials as particles constituting the particle group of the core.

As the core block, similarly to the rigid particles, ceramics, glass, and hard heat-resistant resins can be used, but in the core block having a hollow structure, metals such as iron, aluminum, copper, and titanium, or elastically deformable materials such as resins containing reinforced fiber formed from glass fiber, carbon fiber, aramid fiber, silicon carbide fiber, or the like are favorable materials.

When by using the rigid particles and the core block in the particle group constituting the core, a part of the outer surface of the core is pressed to form a depressed portion in the outer surface so that the internal pressure of the core is increased, slippage occurs between the particles constituting the particle group and thus the rigid particles move. The pressing force is controlled by doing this so that the movement of the particle group by the core block can be adjusted in a desired direction, and fluidity and pressure transmission of the particle group in the core are improved. Moreover, a pressure can be further applied actively by elastic deformation of the core block having a hollow structure.

Moreover, when the mold clamping position of the molding die is fixed such that the length in the vertical direction of the vertical part becomes a specified length, the pressure between the core and the inner surface of the prepreg can be increased by pressing a part of the outer surface of the core. According to this, it is possible to avoid occurrence that the vertical part is compressed so that the length thereof as described above is equal to or less than a specified length and to form the prepreg with a desired thickness.

Further, for example, even in a case where a right-angled portion is formed in the angular portion on the outer surface of the prepreg, a sufficient amount of the prepreg can be moved to the corner portion, which forms the angular portion, of the molding die. Thus, it is possible to accurately mold the angular portion on the outer surface of the prepreg along the molding surface of the molding die.

When the internal pressure of the core is increased, the particle group causes slippage in directions back and forth from side to side, allowing the particle group to move. However, the flexible bag accommodating the particle group is made of a material which can be expanded and unfolded. For this reason, the flexible bag which can be expanded and unfolded can allow the external shape of the core to be deformed according to movement of the particle group.

In a case where the flexible bag does not have strength enough to maintain particle group against the internal pressure when the internal pressure of the core is increased by the clamping of the molding die or the pressing to form a depressed portion, the particle group may cause rupture of the packaging film. If the spacing in the molding disc is smaller than the diameters of particles, the particle group does not leak out of the molding die unless particles are crushed.

As the configuration in which a part of the outer surface of the core is pressed, a rod projectable inward from the molding surface of the molding die can be used and a part of the outer periphery of the core can be pressed by inserting the rod into the inside of the molding die. For causing the rod to be projectable inward from the molding surface of the molding die, for example, a piston rod can be used as the rod. Further, a pressing member can be disposed at a plurality of positions.

In the present invention, when the outer surface of the core is pressed, a part of the outer surface of the core can be pressed through or not through prepreg. In the case of pressing the outer surface of the core through the prepreg at a substantially planar portion, the concave portion is formed in the prepreg. In the case of pressing the outer surface of the core through the prepreg at a convex shaped portion, the prepreg becomes flat. A discharging hole for discharging the granular material constituting the core from the molded article can be provided in these concave portion and flat portion that are pressed portions and even in other pressed portions. Further, even in a case where the shape of the molded article is bent like an L-shaped pipe material, or the like, the core block is divided, or when the core block has bendability, by forming an opening on one of end portions of the pipe, the core block can be removed through the opening. Moreover, the core block can also be reused.

Further, in a case where a part of the outer surface of the core is pressed not through the prepreg, a hole is formed in advance in a portion of the prepreg corresponding to a pressing member such as a rod so that pressure can be directly applied to core, and the flexible bag is torn from the hole position of the molded article so that the particles can be discharged. By subjecting the flexible bag to a mold release treatment in which a release agent is applied and the like, or double-packaging the flexible bag, the flexible bag with which particles are in contact can also be removed. In a case where the hole is larger than the core block, the core block can also be extracted through that hole.

BRIEF DESCRIPTION OF DRAWINGS

FIG. 1 is a schematic view illustrating an example at the time of pressure molding according to the present invention;

FIG. 2 is a schematic view illustrating different shape examples and structure examples of a core block that is one of constituent members of a core in the present invention;

FIG. 3 is a partial cross-sectional view schematically illustrating internal structures of a prepreg and a core that are materials for a molded article;

FIG. 4 is a partial cross-sectional view schematically illustrating other internal structures of a prepreg and a core that are materials for a molded article;

FIG. 5 is an explanatory view schematically illustrating a state at an initial stage when a molded article having a hollow part of Conventional Example 1 is formed;

FIG. 6 is an explanatory view schematically illustrating a state at the time of pressure compression molding when the molded article having a hollow part of Conventional Example 1 is formed similarly;

FIG. 7 is an explanatory view schematically illustrating a state at the time of pressure compression molding in Conventional Example 2; and FIG. 8 is a schematic view illustrating each stage at which a molded article having a hollow part is manufactured.

MODE(S) FOR CARRYING OUT THE INVENTION

Hereinafter, preferred embodiments of the present invention will be described in detail with reference the accompanying drawings, centering on Examples. Incidentally, the present invention is not limited to Examples described below, and various modifications can be made as long as they are within the scope described in the claims.

EXAMPLES

Example 1

As illustrated in FIG. 1, a preform in which the prepreg 3 encasing the core 4 is shaped at room temperature into substantially the same shape as that of the inner periphery of a molding die 15 is placed inside a concave portion 1a formed in the lower mold 1 of the molding die 15 which is pre-heated.

The prepreg 3 can be made as a sheet-like material by impregnating fiber such as carbon fiber, glass fiber, aramid fiber, or silicon carbide fiber with an uncured thermosetting resin. In the example illustrated in the drawing, the cross-sectional shape of the prepreg 3 is formed into an annular shape, inside which the core 4 is interposed. For example, the prepreg 3 can be configured as illustrated in the drawing by forming the prepreg 3 such that the core 4 is wrapped between two sheet-like prepregs.

Then, the prepreg 3, which has been in the molten state by the heating of the molding die, is subjected to pressure molding in the molding die 15 so as to be cured, and thus a fiber-reinforced plastic (FRP) molded article having a desired shape can be manufactured. In a case where the fiber is impregnated with a thermoplastic resin instead of a thermosetting resin, a preform which is shaped by heating the prepreg 3 in advance can be pressurized and cooled by the molding die to manufacture an FRP molded article having a desired shape. Furthermore, a fiber-reinforced plastic (FRP) molded article can be manufactured by using fabric not impregnated with a resin instead of the prepreg and using a resin transfer molding (RTM) method in which a thermosetting resin is injected and cured after mold clamping.

As the thermosetting resin impregnated in the fiber, epoxy resins, urea resins, vinyl ester resins, unsaturated polyester, polyurethane, phenolic resins, and the like can be used, and as the thermoplastic resin, polypropylene, polyethylene, polystyrene, polyvinyl chloride, polyamide resins, and the like can be used.

The core 4 in this Example 1 is, as illustrated in FIG. 1, configured by accommodating the particle group 4a and a hollow core block 100 having a round cross-section and bendability in a direction orthogonal to the longitudinal direction (the front-back direction), in the flexible bag 4b.

As the rigid particles, ceramics such as alumina and zirconia, glass, hard heat-resistant resins, metals, foundry sand, and the like which have a high rigidity with a bending elastic modulus of 50 GPa or more can be used. Particularly, in the case of using zirconia or quartz formed from ceramics, these materials have low thermal conductivity and thus are favorable materials as the particle group 4a of the core 4.

The particle diameter of the rigid particles used in the present invention is not particularly limited, but from the viewpoint of having a tendency that adhesiveness among the prepreg 3, the molding die 15, and the core 4 becomes favorable, is set preferably in a range of 0.1 mm to 10 mm and more preferably in a range of 0.5 mm to 3 mm. Herein, the rigid particles used in the present invention include a first particle group (a) and a second particle group (b) each having a different particle diameter as illustrated in FIG. 4, and a ratio Da/Db of a diameter Da of the first particle group (a) to a diameter Db of the second particle group (b) is set more preferably in a range of 1.1 to 2.0. Furthermore, a ratio of the total amount of the second particle group (b) to the total amount of the particle group accommodated in the flexible bag 4b is particularly preferably in a range of 20 to 60% by mass.

Incidentally, in the present invention, the core block 100 that is one of constituent members necessary for constituting the core 4 is accommodated in the flexible bag 4b which can be expanded and unfolded, together with the particle group 4a. This core block 100 is disposed for reducing an increase in the weight of the core 4 according to an increase in the size of the core 4. Herein, in order to decrease the core 4 in weight, a volume ratio of the core block 100 in the flexible bag 4b is set to preferably 50% or more and more preferably 60% or more. In addition, since there is a tendency capable of causing a sufficient amount of the rigid particles to exist between the core block 100 and the inner surface of the flexible bag 4b in order to obtain a molded article having a desired shape, the volume ratio of the core block 100 in the flexible bag 4b is set to preferably 90% or less and more preferably 80% or less.

FIG. 2 illustrates the core blocks 100 having a plurality of types of shapes and structures. As a result of experiments and tests conducted by the present inventors, it is known that the presence of the core block 100 and the shape and structure of the core block 100 greatly influence the quality of a fiber-reinforced plastic molded article. In the case of not using the core block, compression stress vertically acting reaches almost five times the stress acting in the horizontal direction.

FIG. 2 illustrates the core blocks 100 each having a different shape and structure. FIG. 2(a) illustrates a solid core block having a barrel shape, FIG. 2(b) illustrates a solid core block having a rectangular shape, FIG. 2(c) illustrates a hollow core block having a rectangular shape, FIGS. 2(d) and 2(f) illustrate inverted cup shapes, FIG. 2(f) illustrates a hollow bottomed core block having a right-left asymmetric shape, and FIG. 2(e) illustrates a hollow core block having a longitudinally elliptical shape. FIG. 3 partially illustrates internal structures of the prepreg 3 and the core 4 in a molded semi-finished article. FIG. 4 partially illustrates other internal structures of the prepreg 3 and the core 4 in a molded semi-finished article.

When a difference in stress between the perpendicular direction and the horizontal direction, the movement in the up-and-down direction of the particle group 4a in the core 4 is active, the movement in the horizontal direction is less, directionality is applied to deformation of the flexible bag 4b by the particle group 4a, and for example, stress transmitted to the corner portion of the molding die through the prepreg is biased in one direction. For example, deformation of the flexible bag is deformed toward the vertical direction, stress enough to fill the voids formed between the inner surface along the vertical direction of the molding die 15 and the prepreg 3 does not act in the horizontal direction, and the voids remain even after completion of molding. Thus, it is preferable that a difference in stress can be reduced as much as possible.

As the material of the core block 100, similarly to the rigid particles, ceramics, glass, and hard heat-resistant resins can be used, but in the hollow structure that is lightweight and improves pressure transmission, metals such as iron, aluminum, copper, and titanium, or elastically deformable materials such as fiber-reinforced resins using glass fiber, carbon fiber, aramid fiber, or silicon carbide fiber as reinforcing fiber are favorable materials.

As the flexible bag 4b used for maintaining the shape of the core 4, a nylon film, a polyethylene film, a fluororesin film, silicone rubber, polypropylene, and the like can be used.

A cylinder 5 which inserts a rod into the cavity of the molding die 15 and has a piston rod 5a pressing a part of the outer periphery of the core 4 is provided in the lower mold 1. Incidentally, in FIG. 1, pipes for supplying and discharging an operating fluid to a pressure chamber of the cylinder 5 in order to slide the piston rod 5a is not illustrated in the drawing.

First, the prepreg 3 placed inside the concave portion 1a of the lower mold 1 can be heated and cured by moving the upper mold 2 and the lower mold 1 in a direction in which they become closer, and then performing mold clamping completely. Since the pressure is not high in this stage and the pressure is increased by operating the piston rod 5a at the subsequent stage, any mold clamping device can be used as long as it has an open-close mechanism of a mold, and it is not necessary to daringly employ a high-pressure press machine.

At this time, by causing the piston rod 5a to protrude in the cavity of the molding die 15, a part of the portion on the outer surface of the core 4 in the prepreg 3 is pressed. The fluidity is provided to the particle group 4a due to this pressing to deform the core 4 and the particle group 4a is spread to every corner of the molding die 15 so as to eliminate voids formed between the prepreg 3 and the inner surface of the mold. The sizes of the particles accommodated in the flexible bag 4b all are the same in FIG. 1; however, in a case where particles each having a different size are mixed and used as illustrated in FIG. 4, the fluidity of the particle group 4a is increased, and thus slippage easily occurs in the particle group inside the core 4.

Particularly, the outer surface of the core 4 can be brought into close contact with the inner surface of the prepreg 3 by expanding the outer surface of the core 4 such that bending, wrinkles, or voids do not occur which are generated in four corners in the inner surface of the prepreg 3 in which voids easily occur or in a region along the inner surface of the vertical part formed along the wall of the concave portion (cavity) 1a in the lower mold 1. Thus, a molded article having high dimensional precision can be obtained.

By expanding the outer surface of the core 4, air of the voids is crushed due to high internal pressure by the core 4 or released into the atmosphere from the molding die 15 even when voids are formed between the prepreg 3 warping the core 4 and the core 4. The passage formed when the air passes through the prepreg 3 is spontaneously closed by the prepreg 3 melted after the air passes through the prepreg.

Further, even in a case where the voids between the molding die 15 and the prepreg 3 are present in the angular portion of the molding die 15, the prepreg 3 moves to the void side by pressing from the core 4 in which the outer surface shape is expanded. Then, air which has formed this void can be crushed by the high internal pressure or can be extruded from the molding die 15 out to the atmosphere.

The prepreg 3 moves to a portion of the void to which the air is extruded out to form a molded article into a shape along the angular portion shape of the molding die 15. According to this, as a molded article formed by heat pressing the prepreg 3, for example, a high-grade molded article in which the angular portion is formed into a right angle is obtained.

A pressing force in the perpendicular direction is applied to the core block 100 accommodated inside the flexible bag 4b from the upper and lower sides during that molding. However, since the core block 100 is set to have a shape in which the outer contour shape of the periphery orthogonal to the perpendicular direction is curved outward and bulges as described before, needless to say in the case of a solid shape, and even in the case of a hollow shape, the original shape is maintained without the bulging surface being contracted inward and deformed or being bent along the perpendicular direction. Thus, the particle group 4a is stably supported, and further, the particle group 4a covering the vicinity of the core block 100 can be moved uniformly in all directions. Accordingly, the prepreg 3 can be spread to every corner without remaining voids to thereby obtain a high-grade molded article.

Incidentally, in each drawing used for the descriptions in Examples, for the purpose for clearly illustrating the flexible bag 4b, the thickness of the flexible bag 4b is illustrated to be exaggeratedly thick. Actually, the flexible bag 4b can be configured to have a thin-film shape having a thickness of 1 mm or less. Herein, the configuration for molding a molded article having a rectangular-pipe shape is described, but a molded article may have other shapes having a closed cross-section.

Shapes having an approximately closed cross-section include those having a C-shaped cross-sectional shape and the like. For example, in a case where a molded article having a C-shaped cross-sectional shape is formed, a part of the core can be positioned to make direct contact with the molding surface of the upper mold 2 or the lower mold 1. Then, a molded article having a C-shaped cross-sectional shape can be molded by covering the circumference of the core which is not in contact with the molding surface with the prepreg 3. Therefore, a closed cross-section in the invention of the present application encompasses not only a rectangular-pipe shape or the like but also, for example, a C-shaped cross-sectional shape.

As illustrated in FIG. 1, a concave portion 6 is formed in the outer surface of the prepreg 3 by pressing a part of the outer surface of the core 4 with the piston rod 5a. When the outer surface of the core 4 is pressed with the piston rod 5a, the volume of the piston rod 5a projected into the volume of the particle group 4a is forcefully added to the volume of the core 4. As a result, the internal pressure in the core 4 can be increased.

When the internal pressure in the core 4 is increased, the particles cause slippage between the particles, allowing the particle group 4a to move in the directions back and forth from side to side. However, since the flexible bag 4b accommodating the particle group 4a can be expanded and unfolded without substantially restricting the movement of the particle group 4a.

As described above, since slippage can be caused between the particles constituting the particle group 4a by increasing the internal pressure of the core 4, the outer surface of the core 4 can be expanded, and as illustrated in FIG. 3 and FIG. 4, voids between the core 4 and the prepreg 3 can be eliminated.

Moreover, since the enlargement of the outer surface shape of the core 4 occurs in a portion in which the pressure between the core 4 and the prepreg 3 is low and where voids are likely to occur, the thickness of the prepreg 3 can be maintained in a predetermined thickness while eliminating the voids.

As described above, the prepreg 3 having a desired outer surface shape with a predetermined thickness can be pressure-molded.

FIG. 8 illustrates a state where a part of the molded semi-finished article 10a in which pressure molding by the molding die 15 (see FIG. 7) is completed is extracted from the molding die 15. The concave portion 6 (see FIG. 1) is formed in the portion of the prepreg 3 which is pressed with the piston rod 5a.

When a hole for discharging the particle group is formed at the concave portion 6, air flows in between the particles constituting the particle group 4a that is one of constituent members of the core 4 through the hole to disrupt the binding state between the particles constituting the particle group 4a. Then, the particle group 4a having a disrupted binding state can be discharged to the outside through the discharging hole formed at the concave portion 6.

If the core block 100 has a size enough to extract the core block from the concave portion 6, the core block 100 can be extracted together with the particle group 4a, and if the core block 100 has a size not enough to extract the core block from the concave portion 6, an opening is formed at the end portion of the molded article 10 so that the core block can be removed. The flexible bag 4b which accommodated the particle group 4a is made of a material having good releasability with respect to the molded article 10 or the flexible bag 4b is doubly configured, and thus it is also possible to remove the flexible bag 4b in contact with the particle group 4a. Even in a case where the shape of the molded article is bent like an L-shaped pipe, the core block is divided or when the core block has bendability, similarly, the core block can be removed.

As described above, since pressure molding can be carried out on the prepreg 3 in a state where no void occur between the core 4 and the prepreg 3, as the molded article 10, a product having a desired outer surface shape with a desired thickness without bends or wrinkles can be manufactured. In addition, even in a case where the internal pressure in the core 4 is low in a state where the molding die 15 is closed, the internal pressure in the core 4 can be increased by pressing force applied from the piston rod 5a, and thus a product having a desired outer surface shape with a desired thickness can be manufactured as the molded article 10.

This Example 1 will be described in more detail. As illustrated in FIG. 1, the core 4 was manufactured by wrapping with a nylon film and accommodating ceramic particles (diameter: 1 mm, bending elastic modulus: 210 GPa) as the rigid particles and a helically wound flexible steel tube (outermost diameter: 13.8 mm, innermost diameter: 11 mm, depth: 20 mm, bending elastic modulus: 200 GPa) having a circular cross-sectional shape and a minute step difference in the axial direction as the hollow core block 100. The core 4 was wrapped in five piles of the prepreg 3 of a carbon fiber-reinforced epoxy resin (manufactured by Mitsubishi Rayon Co., Ltd., product name: TR395 G100S) in a winding manner to form a preform having substantially the same shape as the inner periphery shape of the L-shaped molding die 15 at room temperature. The preform was placed in the concave portion 1a formed in the lower mold 1 of the molding die 15 at room temperature, the upper mold 2 and the lower mold 1 were completely clamped, and then a part of the outer surface of the core 4 was pressed with the piston rod 5a.

In the manufacturing method for Example 1 using the particle group, which includes the ceramic particles and the core block 100 of the flexible tube, in the core 4, both of fluidity and pressure transmission of the particle group 4a were improved, and after the heat pressure molding, the particle group and the flexible tube were removed from one end portion so as to obtain an L-shaped pipe molded article with favorable appearance.

EXPLANATIONS OF LETTERS OR NUMERALS

1 LOWER MOLD
1a CONCAVE PORTION
2 UPPER MOLD
2a LOWER INCLINED SURFACE
3 PREPREG
4 CORE
4a PARTICLE GROUP
4b FLEXIBLE BAG (PACKAGING FILM)
5 CYLINDER
5a PISTON ROD
6 CONCAVE PORTION
10 MOLDED ARTICLE
10a MOLDED SEMI-FINISHED ARTICLE
15 MOLDING DIE
20 MOLD INTERVAL HOLDING MEANS
21a PRESS MEMBER
21b WEDGE FACE
30 MOLDING DIE
31 LOWER MOLD
32 UPPER MOLD
33 CORE
33a POWDER-AND-GRANULAR MATERIAL
33b PACKAGING MATERIAL
35 and 34 UPPER AND LOWER FIBER-REINFORCED THERMOPLASTIC RESIN MATERIAL (FRTP)
36 PREPREG
37 VERTICAL PART
100 CORE BLOCK The claims stand as follows:
1. A method for manufacturing a fiber-reinforced plastic molded body, the method comprising:
   accommodating a particle group including rigid particles and a core block in a flexible bag to obtain a deformable core;

disposing the deformable core and a prepreg containing a resin and fibers inside a molding die such that the deformable core is disposed inside the prepreg, subsequently compression molding the prepreg, and pressing a part of an outer surface of the core at the time of the compression molding so as to provide fluidity to the particle group for deforming the deformable core.

2. The method according to claim 1, wherein the core block has bendability.

3. The method according to claim 1, wherein the core block has a shape in which a periphery orthogonal to a pressing direction is curved outward and bulges.

4. The method according to claim 1, wherein the core block has a hollow shape.

5. The method according to claim 1, wherein the core block is made of an elastically deformable material.

6. The method according to claim 2, wherein the core block is a flexible tube.

7. The method according to claim 1, wherein a bending elastic modulus of the rigid particles is 50 GPa or more.

8. The method according to claim 1, wherein the rigid particles are ceramic particles.

9. The method according to claim 1, wherein a rod is inserted into the inside of the molding die to press a part of the outer surface of the core.

10. The method according to claim 9, wherein the rod is a piston rod.

11. The method according to claim 9, further comprising discharging the rigid particles to the outside of a molded article through an insertion position of the rod after completion of the compression molding.

* * * * *